United States Patent
Dambal et al.

(10) Patent No.: US 10,146,550 B2
(45) Date of Patent: Dec. 4, 2018

(54) SYSTEM AND METHOD TO REMOTELY DETECT AND REPORT BOOTABLE PHYSICAL DISK LOCATION

(71) Applicant: Dell Products, L.P., Round Rock, TX (US)

(72) Inventors: Sanjeev S. Dambal, Austin, TX (US); Satyajit D. Desai, Round Rock, TX (US); Dinesh K. Ragupathi, Round Rock, TX (US); Texas Roemer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 107 days.

(21) Appl. No.: 15/082,281

(22) Filed: Mar. 28, 2016

(65) Prior Publication Data

US 2017/0277545 A1 Sep. 28, 2017

(51) Int. Cl.
*G06F 9/44* (2018.01)
*G06F 9/4401* (2018.01)
*G06F 3/06* (2006.01)

(52) U.S. Cl.
CPC .......... *G06F 9/4403* (2013.01); *G06F 3/0604* (2013.01); *G06F 3/0632* (2013.01); *G06F 3/0689* (2013.01); *G06F 9/4416* (2013.01)

(58) Field of Classification Search
CPC ..... G06F 1/32; G06F 1/26; G06F 1/28; G06F 1/00
USPC ....... 713/300, 310, 320, 321, 322, 323, 324, 713/345, 375
See application file for complete search history.

(56) References Cited

U.S. PATENT DOCUMENTS

| | | | | |
|---|---|---|---|---|
| 6,346,954 B1* | 2/2002 | Chu | ...................... | G06F 3/0605 711/114 |
| 6,353,885 B1* | 3/2002 | Herzi | ..................... | G06F 9/4411 713/1 |
| 8,188,972 B1* | 5/2012 | Krenz | ................... | G06F 3/0482 345/156 |
| 2007/0091504 A1* | 4/2007 | Ulrich | ................. | G11B 23/0311 360/99.14 |
| 2007/0260761 A1* | 11/2007 | Lu | ......................... | G06F 9/4411 710/8 |

(Continued)

*Primary Examiner* — Jaweed A Abbaszadeh
*Assistant Examiner* — Keshab R Pandey
(74) *Attorney, Agent, or Firm* — Fogarty LLP

(57) ABSTRACT

Methods, devices and systems for identifying storage devices received within a plurality of drive bays, where the devices are identified via a visual indicator associated with each drive bay. A controller identifies storage devices that host booted operating systems. The controller activates the visual indicator associated with drive bays that receive the identified booted storage devices. The visual indicator may be a status light generated by a light source associated with each drive bay. This visual indicator may also be a graphical component of a remote management interface. To identify storage devices with booted operating systems, the controller determines the visual indicators to activate based on information received from a storage controller identifying the storage devices at each bay and an identification of booted drives received from a BIOS. The visual indictors may separately identify booted storage devices and bootable storage devices that are not presently booted.

20 Claims, 4 Drawing Sheets

(56) References Cited

U.S. PATENT DOCUMENTS

| | | | |
|---|---|---|---|
| 2010/0113904 A1* | 5/2010 | Batchelder | A61B 5/14551 600/324 |
| 2012/0236491 A1* | 9/2012 | Wallace | G06F 1/187 361/679.33 |
| 2013/0080697 A1* | 3/2013 | Dhandapani | G06F 11/3034 711/114 |
| 2014/0141649 A1* | 5/2014 | Standish | G06K 7/10415 439/620.01 |
| 2015/0089209 A1* | 3/2015 | Jacobs | G06F 21/572 713/1 |

* cited by examiner

SYSTEM AND METHOD TO REMOTELY DETECT AND REPORT BOOTABLE PHYSICAL DISK LOCATION

FIELD

This disclosure relates generally to Information Handling Systems (IHSs), and more specifically, to the identification of storage devices in an IHS.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as supporting cloud services, financial transaction processing, airline reservations, enterprise data storage, global communications, etc. In addition, IHSs may include a variety of hardware and software components that may be configured to process, store, and communicate information and may include one or more computer systems, data storage systems, and networking systems.

An individual IHS may include various types of server components. An IHS may include one or blade server components, where each blade server is housed within a chassis that allows the blade server to be stacked within a rack enclosure. Alternatively or in addition, an IHS may include one or more rack server components that can be stacked directly within a rack enclosure. Alternatively or in addition, an IHS may also include one or more tower server components that need not be stacked or otherwise housed in a rack enclosure, but may be adapted for such implementations. In certain IHSs, the server components, whether blade servers, rack servers or tower servers, may include an array of drive bays, in which storage devices can be inserted. Such arrays of storage devices can be used to implement storage solutions that share or replicate data across the array of storage devices. In certain configurations, the individual storage devices can be removed from a drive bay of a server while the server and the IHS remain running.

The storage devices connected to the server components may be utilized for mass storage functions, but in some scenarios, the storage devices may have a bootable operating system installed. Removing a storage device from a server component can be problematic in situations where the IHS or a related system has booted an operating system that is running on the removed storage device. Even if the IHS is not presently booted from a running operating system, removal of a storage device containing the bootable operating system may still result in a system malfunction at a later time. When retiring or repurposing the server component, identifying storage devices with a bootable operating system may facilitate reusing those storage devices without requiring reinstallation of the operating system.

SUMMARY

Exemplary embodiments of systems, methods and devices for identifying storage devices are presented. In an embodiment, an Information Handling System (IHS) may include a plurality of drive bays, each of the plurality of drive bays configured to receive a storage device, and each of the plurality of drive bays having a visual indicator associated therewith; and a Baseband Management Controller (BMC), the BMC configured to identify a storage device received in one of the plurality of drive bays, wherein the identified storage device has a booted operating system stored thereon; and to activate the visual indicator associated with a drive bay that receives the identified booted storage device, wherein the visual indicator is activated according to primary indication.

In an additional IHS embodiment, to identify the storage device, the BMC is further configured to receive, from a storage controller, drive information for each storage device received at a drive bay of the plurality of drive bays; to receive, from a Basic Input/Output System (BIOS), an identification of one or more booted drives; and to determine the drive bay that receives the identified booted storage device based on the drive information and the identification of the one or more booted drives. In an additional IHS embodiment, visual indicator is a status light generated by a light source associated with each drive bay. In an additional IHS embodiment, the drive information received from the storage controller are UEFI instructions that specify each storage device received at the plurality of drive bays. In an additional IHS embodiment, the identification of one or more booted drives received from the BIOS are modifications to the UEFI instructions. In an additional IHS embodiment, the BMC is further configured to identify a storage device received in one of the plurality of drive bays that has a bootable operating system stored thereon; and to activate the visual indicator associated with a drive bay that receives the identified bootable storage device, wherein the visual indicator is activated according to secondary indication. In an additional IHS embodiment, the identified one or more booted drives comprises a virtual drive and wherein the BMC if further configured to determine one or more booted storage devices corresponding to the virtual drive.

In another embodiment, a memory device having program instructions stored thereon that, upon execution by a server component comprising a plurality of drive bays, wherein a visual indicator is associated with each drive bay, and wherein each drive bay is configured to receive a storage device, may cause the server component to identify a storage device received in one of the plurality of drive bays, wherein the identified storage device that has a booted operating system stored thereon; and to activate the visual indicator associated with a drive bay that receives the identified booted storage device, wherein the visual indicator is activated according to primary indication.

In an additional memory device embodiment, the visual indicator is graphical component of remote management interface. In an additional memory device embodiment, the visual indicator is activated in response to a command issued via the remote management interface. In an additional memory device embodiment, the visual indicator is a textual response activated in response to a command issued via a command-line interface. In an additional memory device embodiment, program instructions may cause the server component to: receive, from a storage controller, drive information for each storage device received at a drive bay of the plurality of drive bays; to receive, from a Basic Input/Output System (BIOS), an identification of one or more booted drives; and to determine the drive bay that receives the identified booted storage device based on the drive information and the identification of the one or more booted drives. In an additional memory device embodiment, program instructions may cause the server component to identify a storage device received in one of the plurality of drive bays that has a bootable operating system stored thereon; and to activate the visual indicator associated with a drive bay that receives the identified bootable storage device, wherein the visual indicator is activated according to secondary indication. In an additional memory device embodiment, the identified one or more booted drives comprises a virtual drive and wherein the program instructions further may cause the server component to determine one or more booted storage devices corresponding to the virtual drive.

In another embodiment, a method identifies storage devices received at one of a plurality of drive bays of a server component, wherein a visual indicator is associated with each drive bay, the method comprises identifying a storage device received in one of the plurality of drive bays, wherein the identified storage device has a booted operating system stored thereon; and activating the visual indicator associated with a drive bay that receives the identified booted storage device, wherein the visual indicator is activated according to primary indication.

In an additional method embodiment, to identify the storage device, the method further comprises receiving, from a storage controller, drive information for each storage device received at a drive bay of the plurality of drive bays; receiving, from a Basic Input/Output System (BIOS), an identification of one or more booted drives; and determining the drive bay that receives the identified booted storage device based on the drive information and the identification of the one or more booted drives. In an additional method embodiment, the visual indicator is a status light generated by a light source associated with each drive bay. In an additional method embodiment, the drive information received from the storage controller are UEFI instructions that specify each storage device received at the plurality of drive bays. In an additional method embodiment, the identification of one or more booted drives received from the BIOS are modifications to the UEFI instructions. An additional method embodiment, further comprises identifying a storage device received in one of the plurality of drive bays that has a bootable operating system stored thereon; and activating the visual indicator associated with a drive bay that receives the identified bootable storage device, wherein the visual indicator is activated according to secondary indication.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

Figure 1:
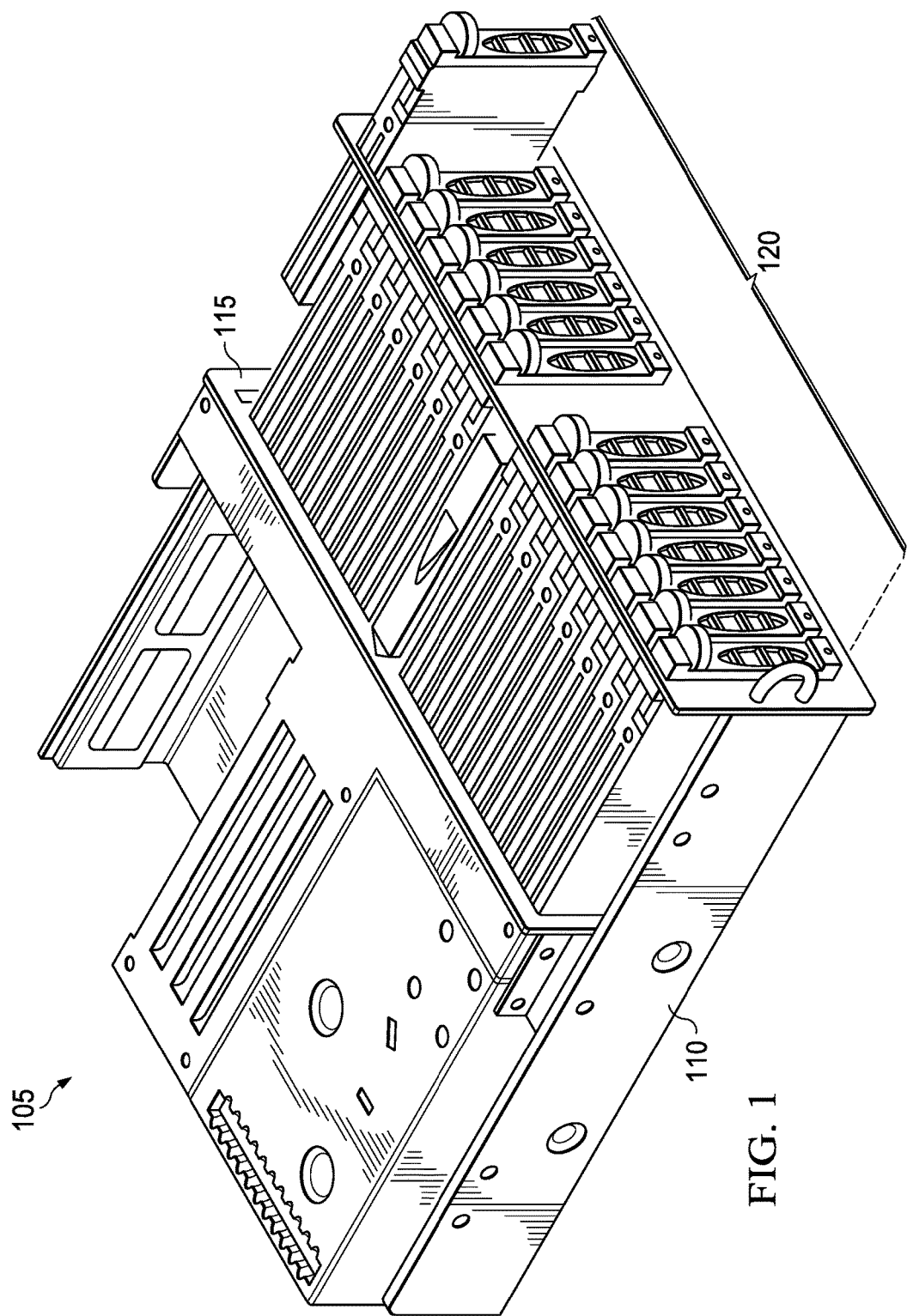
FIG. 1 illustrates certain components of a blade server component.

FIG. 1 depicts a blade server 105 that can be stacked within a rack that is a component of an IHS. The blade server 105 is housed within a chassis 110. Other blade servers or other components housed within the same type chassis 110 as blade server 105 can be stacked within a rack along with blade server 105. The blade server 105 includes a backplane 115 that separates the chassis 110 into a set of drive bays 120 at the front and a rear cavity. The blade server 105 is connected to various resources via cables that are inserted at the rear of the chassis 110.

The plurality of storage devices are connected to the backplane 115 of the blade server 105. Each individual storage device can be plugged into a drive bay 120 at the front of the blade server 105. Certain blade servers 105 may support a variety of devices via its drive bays 120. In the illustrated blade server 105, the devices plugged into the drive bays 120 are all storage devices. The types of storage devices that can be supported by blade server 105 depends in part on the connectors and wiring of the backplane 115. Blade server 105 supports the ability to unplug storage devices from their respective drive bays while the blade server 105 and the storage devices in other drive bays remain operational. In various configurations, the chassis 110 may be comprised of different numbers of drive bays. Various chassis configurations may utilize combinations of quarter-height, half-height and/or full-height drive bays. Blade server 105 is described for sake of illustration only and many variations (e.g., number of blade components, types of components comprising the blade, distribution of components within the blade, etc.) may be present in other chassis.

Certain server components, including blade servers, rack servers and tower servers, provide visual indicators for each drive bay. In certain server components, the visual indicator is a status light, such as an LED or OLED light source. The status light may be positioned above or below each drive bay, where each light source is controlled via signals from the backplane of the server component. Certain server configurations may provide status light indicators at the front of the server component via light guides that are optically coupled to light sources generated at the backplane of the server component. In some server components, the light guide used to couple a light source to the front of the server for each drive bay may be a component of the chassis or enclosure. In other server components, the light guide for each drive bay may instead be a component of the device that is inserted into the drive bay. For instance, certain storage devices include light guides that extend along the length of the storage device and couple a light source from the backplane to a visual indicator on the front-facing portion of the storage device. In certain configurations, the status light may also be used for other purposes, such as to visually confirm that the device inserted into a drive bay is properly coupled to the backplane of the server component.

Figure 2:
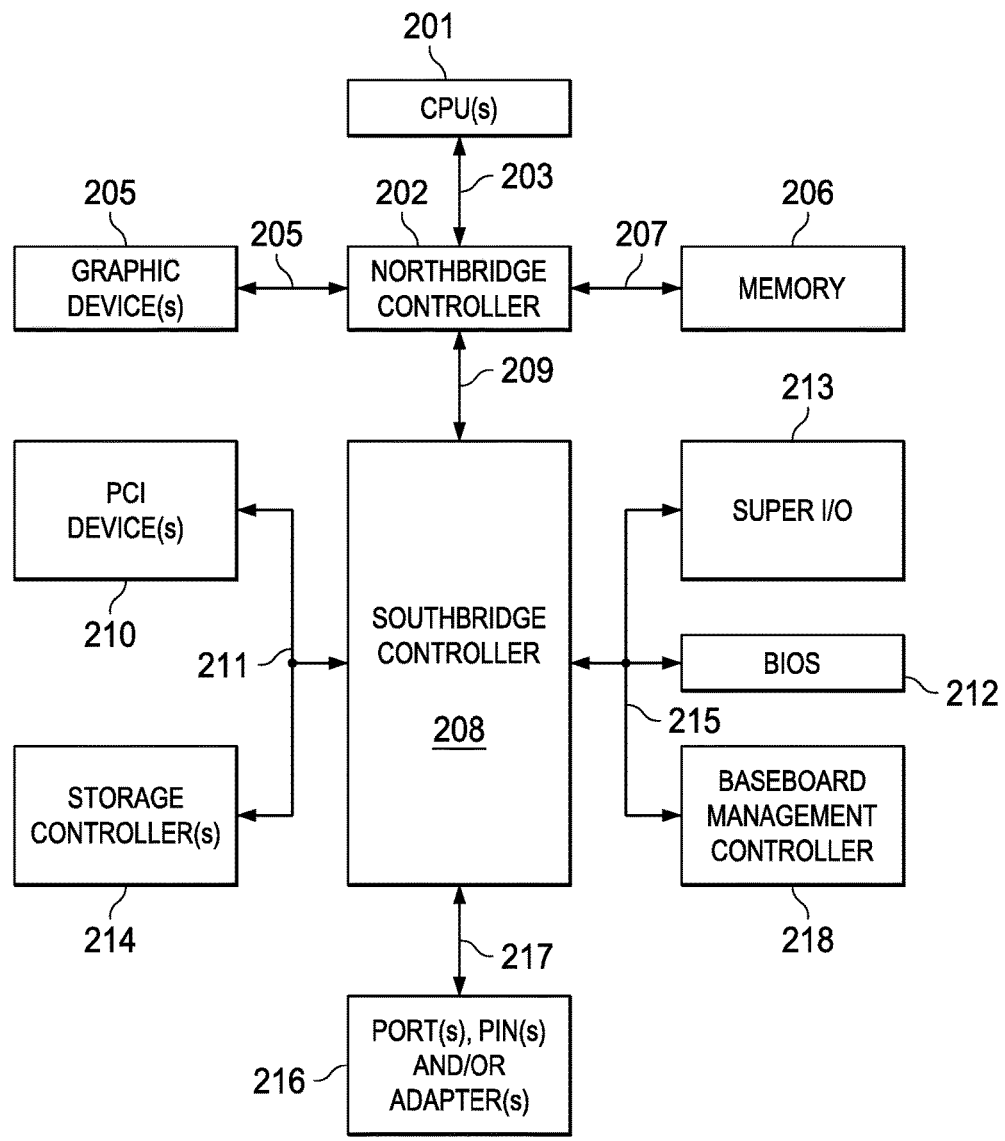
FIG. 2 is a block diagram illustrating certain internal components of a server component.

FIG. 2 depicts certain internal components of a server component comprised within an IHS. The server component may be a blade server, rack server, tower server or other type of server component configured with multiple drive bays in which storage devices may be connected as components of an IHS. As a non-limiting example, a sever component may be a Dell PowerEdge™ server configured as a component of an IHS.

As illustrated, the server component may include one or more CPUs 201. In various embodiments, server component may be a single-processor system including one CPU 201, or a multi-processor system including two or more CPUs 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

CPU(s) 201 are coupled to northbridge controller or chipset 202 via front-side bus 203. Northbridge controller 202 may be configured to coordinate I/O traffic between CPU(s) 201 and other components. For example, in the illustrated implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like). Northbridge controller 202 is also coupled to system memory 206 via memory bus 207. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory.

Northbridge controller 202 is coupled to southbridge controller or chipset 208 via internal bus 09. Generally speaking, southbridge controller 208 may be configured to handle various of the server component's interactions with external systems, and it may provide interfaces such as, for instance, Universal Serial Bus (USB), audio, serial, parallel, Ethernet, or the like via port(s), pin(s), and/or adapter(s) 216 over bus 217. For example, southbridge controller 208 may be configured to allow data to be exchanged between the server component and other devices, such as other server components that comprise the IHS. In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. The I/O capabilities of the server component are utilized to providing visual indicators to an IHS administrator as described with respect to FIGS. 3-5.

Southbridge controller 208 may also enable connections to one or more keyboards, keypads, touch screens, scanning devices, voice or optical recognition devices, biometric devices, or any other devices suitable for entering or retrieving data. Multiple such I/O devices may be connected to a server component. In some embodiments, one or all of the I/O devices may be separate from the server component and may interact with server component remotely through a wired or wireless connection. As illustrated, southbridge controller 208 may be further coupled to one or more PCI devices 210 (e.g., modems, network cards, sound cards, or video cards) via parallel bus 211.

Southbridge controller 208 may be further coupled to one or more storage controllers 214 via parallel bus 211. One some embodiments, one or more of the storage controllers may be SCSI host bus adapters. Storage controller 214 may include any system, apparatus, or device operable to manage the communication of data between one or more storage devices and the server component. As such, storage controller 214 may be implemented using hardware, software, or any combination thereof. Storage controller 214 may operate using multiple different storage technologies, such as SAS, SATA, PCIe SSD, etc. In certain embodiments, a storage controller 214 may provide functionality including, without limitation, disk aggregation and redundancy (e.g., RAID), volume management, logical storage volumes, data routing, error detection and recovery.

Southbridge controller 208 may also be coupled via Low Pin Count (LPC) bus 215 to a BIOS (Basic Input/Output System) 212, a Super I/O Controller 213, and a Baseboard Management Controller (BMC) 218. Super I/O Controller 213 combines interfaces for a variety of lower bandwidth or low data rate devices. Those devices may include, for example, floppy disks, parallel ports, keyboard, mouse, temperature sensors, fan speed monitoring/control, environmental monitoring sensors, etc.

The BIOS 212 is a set of software instructions, typically implemented as firmware, that provide an interface that allows an operating system, and the software programs that comprise the operating system, to communicate with the hardware capabilities of the server component. Another function of the BIOS 212 is to load the operating system to be used by the server component. In some embodiments, the BIOS 212 program instructions may be comprised within a non-volatile memory that may comprise additional software instructions in addition to the BIOS instructions. In addition to providing a hardware interface, the program instructions of BIOS 212 may load the operating system for use by the server component and initialize the hardware components connected to the server component.

In certain embodiments, BIOS 212 is compliant with Unified Extensible Firmware Interface (UEFI) specification. For purposes of this disclosure, Extensible Firmware Interface (EFI) and Universal Extensible Firmware Interface (UEFI) are used interchangeably and called UEFI for simplicity. The UEFI Specification describes an interface between the operating system and system firmware. In particular, the UEFI Specification defines the interface that platform firmware must implement to provide an interface used for booting the operating system. In certain embodiments, UEFI instructions are implemented using a UEFI driver.

A server component according to various embodiments further includes a Baseboard Management Controller (BMC) 218. A BMC is a specialized microcontroller or service processor, which manages the interface between the system management software and the platform hardware. BMC 218 may be utilized to monitor the physical and operational state of the server component and its connected components using sensors. In certain embodiments, BMC 218 includes the ability to interface with a management interface that allows various aspects of the server component to be administered remotely. In certain embodiments, BMC 218 implements such monitoring and management function utilizing IPMI (Intelligent Platform Management Interface). As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely.

As described, certain server components support the ability to swap storage devices from the drive bays while the server and other drive bay devices remain fully operational. A problem arises in server components that support storage devices when a storage device is removed that has a bootable operating system installed. Removing bootable storage devices while a system is running from the booted operating system may result in various different types of runtime failures within the IHS. In addition to any runtime failures, once the bootable storage device is removed, the operating system cannot simply be re-booted. Consequently, administrators may accidently disable an operating system by removing a storage device with an installed bootable operating system. For instance, an administrator swapping a running storage device out of a server component as part of routine operations may mistakenly pull the wrong storage device from the rows of indistinguishable storage devices housed by a server component. Consequently, the ability for administrators to avoid errors in removing bootable storage devices may be improved by providing indicator lights associated with bootable storage devices. In other scenarios, an administrator may utilize indicator lights associated with bootable storage devices in order to identify and repurpose these installed operating systems.

Figure 3:
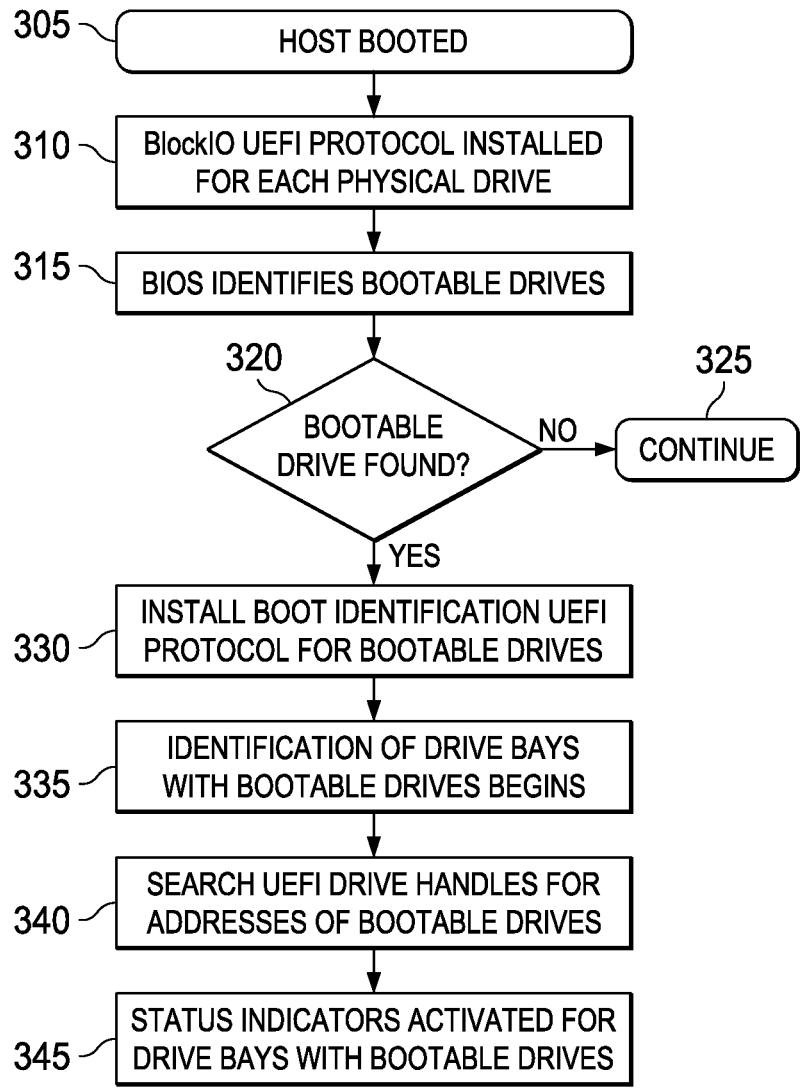
FIG. 3 is a flowchart illustrating certain steps of a method for detecting and reporting physical locations of bootable drives, according to various embodiments.

FIG. 3 is a flowchart that illustrates certain aspects of a process by which certain embodiments provide an indication of the storage devices that have booted and/or bootable operating systems installed upon them, where the storage devices are components of a server component. The process begins at step 305 when the host, typically a server component, has completed booting such that the server component has been initialized as a component of an IHS. At step 310, software instructions are loaded for use by the BIOS of server component in order to identify each physical storage device that is presently loaded in the drive bays of the server component.

In certain embodiments, the software instructions of step 310 are installed by the operation of a storage controller component of the server component. In certain embodiments, these software instructions are UEFI instructions that are installed by a UEFI driver. The information provided by the UEFI instructions is based on physical storage device information provided by the storage controller. In certain embodiments, the UEFI instructions are BlockIO protocol instructions that can be used to enumerate the physical storage devices that are loaded into the drive bays of the server component and thus coupled to the storage controller. In certain embodiments, each set of BlockIO protocol instructions is associated with a UEFI drive handle that unique identifies each storage device coupled to the storage controller. The drive handles are used to associate sets of UEFI software instructions, such as the BlockIO protocol installed at step 310, with each of the storage devices connected to the storage controller.

In certain embodiments, the software instructions installed during step 310 include instructions that specify a device address, such as a SAS (Serial Attached SCSI) address, for each storage device that is connected to the storage controller. In certain embodiments, the device addresses of the storage devices are specified using message device path nodes that are associated with the device path of individual storage devices and store device address information for each storage device.

At step 315, the BIOS determines the storage drives that have bootable operating systems installed on them. These bootable storage drives identified by the BIOS may be physical drives that correspond to a single storage device or logical storage drives that correspond to multiple storage device. In certain embodiments, the BIOS utilizes a boot order list to determine all operating systems available for booting by the IHS and the storage drive associated with each bootable operating system. Certain aspects of a process by which this determination is made by the BIOS are provided with respect to FIG. 4. Using the information provided by the boot order list, the BIOS proceeds to determine, at step 320, whether each of the storage devices identified in step 310 by the storage controller in the UEFI instructions corresponds to a bootable drive. For virtual drives, the corresponding physical drive(s) may be retrieved as provided with respect to FIG. 5. With physical storage device information for each bootable drive, the BIOS specifies this information through modification of the provided UEFI instructions. The BIOS traverses the storage devices listed in the provided UEFI instructions in search of instructions corresponding to bootable storage devices. If the BIOS determines that a storage device associated with a BlockIO protocol does not have a bootable operating system installed on it, the BIOS continues at step 325 without taking further action with respect to that particular storage device. Instead, the BIOS will continue evaluating the remaining of the provided UEFI instructions against the storage devices corresponding to bootable operating systems.

If the BIOS determines that a storage device listed in the provided UEFI instructions has a bootable operating system installed on it, at step 330 the BIOS configures additional software instructions indicating this determination. In certain embodiments, the BIOS installs an additional set of UEFI protocol instructions for a storage devices that is determined to be bootable. For each storage device listed in the provided UEFI instructions that is determined to be bootable, the additional instructions provided at step 330 are appended to the provided UEFI instructions by associating the additional instructions with the UEFI drive handle of the bootable storage device. At the completion of step 330, the BIOS has identified the bootable storage devices, but the BIOS is unable to provide information specifying the drive bays in which these bootable storage devices are loaded.

At step 335, the server component begins the process of identifying drive bays that are loaded with bootable storage devices. In some scenarios, step 335 may proceed automatically upon receiving notification that the BIOS has completed the identification of bootable storage devices. In other scenarios, step 335 commences upon receipt of a command signaling the identification of drive bays containing bootable storage devices. In certain embodiments, such commands are generated via a remote management interface that allows an administrator to signal the identification of bootable drive bays in one or more server components of the IHS. In certain such embodiments, the interface may be a command-line interface that supports a set of special-purpose commands. In certain embodiments, the command-line interface may be provided by the BMC. For instance, embodiments may utilize a command-line interface supported by an IPMI (Intelligent Platform Management Interface) tool or a command-line interface supported by the Dell RACADM (Remote Access Controller Admin) software utility. In certain other embodiments, the remote management interface may be a graphical interface supported by the BMC. In certain of these embodiments, the graphical interface is supported by an iDRAC that supports centralized administration of the IHS.

In certain embodiments, the BMC of the server component is utilized for identifying the drive bays that are loaded with bootable storage devices. At step 340, the BMC utilizes the UEFI software instructions provided by the storage controller and modified by the BIOS in determining the drive bays to be indicated as containing booted and/or bootable storage devices. In certain embodiments, the BMC cycles through all of the UEFI drive handles reported by the storage controller. For each drive handle, the BMC determines whether the BIOS has indicated, via the UEFI instruction modifications generated at step 330, that the storage device associated with the drive handle is bootable. If the BMC identifies a bootable storage devices based on this information, the BMC utilizes the device address information, provided in certain embodiments by the storage controller as part of the BlockIO protocol at step 310, to determine the drive bay in which the bootable storage device is loaded. In certain embodiments, the BMC identifies drive bays with a bootable storage devices by matching the SAS address provided in the drive handle for the bootable storage device with SAS address information provided by the storage controller.

At step 345, the BMC activates a visual indicator that identifies drive bays with bootable storage devices. In certain embodiments, the visual indicators are status lights. As described, the status light associated with each drive bay may be generated by the backplane and conducted to the front of the server component using light guides that may be components of the chassis or component of the storage device itself. Alternatively or in addition to these status lights, in certain embodiments, the visual indicators generated by the BMC are reflected in the output of the remote management interface described above.

In certain embodiments, the visual indicators activated by the BMC are configured to separately indicate both primary booted storage devices and secondary bootable storage devices. As described with respect to FIG. 4, the process for identifying bootable storage devices can be adapted to identify only bootable storage devices that are present booted by the IHS and to identify all bootable storage devices, without regard to whether any aspect of the IHS is presently booted to any of these bootable storage devices. In certain embodiments, the BMC is configured to provide a separate indication of currently booted storage devices and bootable storage devices that are not presently booted by the IHS. In certain embodiments, the BMC may be configured to provide a primary indicator to identify currently booted storage devices. The primary indicator may be a status light of a certain color and/or may be denoted by blinking the status light at a certain frequency. The BMC may be further configured to provide a secondary indicator to identify bootable storage devices not presently booted by the IHS. The secondary indicator may be a status light of a different color from the primary indicator and/or a status light blinking at a different frequency from the primary indicator.

Figure 4:
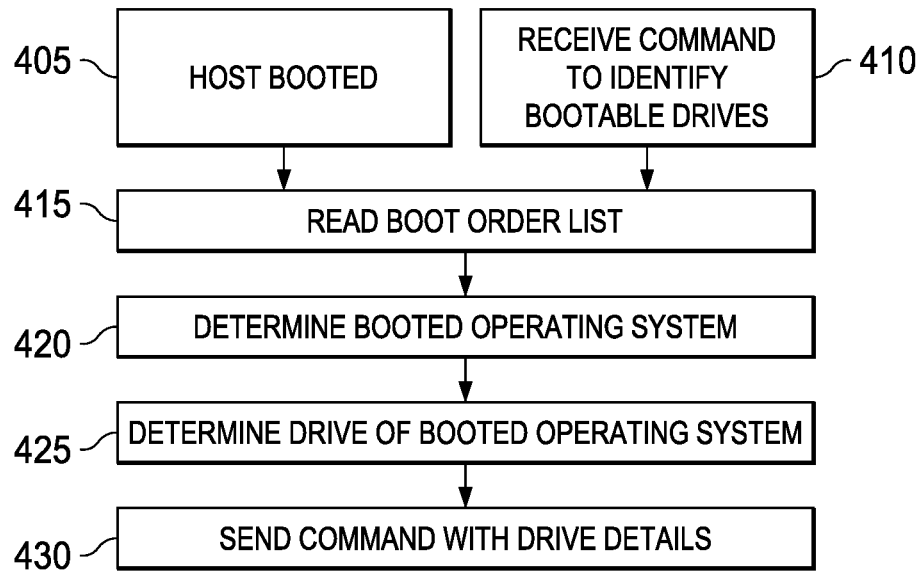
FIG. 4 is a flowchart illustrating certain steps of an additional method for certain aspects of detecting and reporting physical locations of bootable drives, according to various embodiments.

FIG. 4 is a flowchart that illustrates certain aspects of a process by which certain embodiments determine the storage devices that have bootable operating systems installed upon them. In certain embodiments and as described with respect to FIG. 3, this determination is made by the BIOS of the server component. As described, one function of the BIOS is to load the operating system to be booted by the server component. Accordingly, the BIOS maintains a list of available operating systems that can be booted by the server component.

In certain embodiments, the BIOS maintains a boot order list, which may also be referred to as an IPL (Initial Program Load) list. The boot order list contains a list of available operating systems and the drives on which the operating systems are installed. The BIOS may support boot settings that provide the ability to specify the ordering of the operating systems in the boot order list and thus to select the operating system to be booted. In scenarios where the IHS includes multiple drives with operating systems installed on them, these BIOS boot settings provide the ability for an administrator to select the operating system to be booted.

Referring to FIG. 4, the identification of bootable storage devices by the BIOS, in certain scenarios, is commenced at step 405 when the host server component has completed booting such that the server has been initialized as a component of an IHS. In other scenarios, the BIOS commences identification of bootable storage devices upon receiving a command at step 410 directing the BIOS to initiate the process. In certain embodiments, the command received at step 410 is provided via a remote management interface supported by the BMC. In such embodiments, administrators may utilize a graphical interface or a command-line interface by which a command can be issued to one or more of the server components in an IHS, the command directing each of the server components to indicate the location of bootable drives. As described, the location of these bootable drives may be indicated in certain embodiments, by triggering status lights associated with the drive bays in which bootable drives are installed.

Once the identification of bootable drives is commenced by the BIOS, the process continues at step 415 with the BIOS reading the boot order list, which contains the available operating systems. At step 420, the BIOS determines which of the listed operating systems in the boot order list has been booted by the server component. At step 425, the BIOS determines the drive corresponding to the operating system booted by the server component. In some scenarios, the drive information provided by the BIOS will correspond to a physical drive and in other scenarios, the information provided by the BIOS will correspond to a virtual drive. At step 430, the BIOS dispatches a command that indicates the drive from which the server component is currently booted. The command dispatched by the BIOS is directed at the IHS component tasked with specifying the drive bay(s) of the currently booted drive(s). In certain embodiments, the BMC provides this function and thus receives the BIOS command indicating the drive information for the currently booted operating system. In certain embodiments, this command issued by the BIOS is an IPMI (Intelligent Platform Management Interface) command, where IPMI is a protocol is used by the IHS for implementing remote server management functions.

In certain embodiments, the BIOS also provides the BMC with drive information for all storage drives that have a bootable operating system installed upon them in addition to, or instead of, the drive information for the currently booted operating system. As described, the BIOS can navigate the boot order list to identify all bootable operating systems and the drives associated with each bootable operating system. In such embodiments, the BIOS dispatches one or more commands, such as IPMI commands, that provide drive information for bootable storage drives besides the currently booted drive. In such embodiments, the BMC receives the commands and uses the drive information to signal indicators for all drive bays corresponding to bootable storage drives. In certain embodiments and as described above, the indication of the currently booted drive by the BIOS can be used to indicate primary boot drives and the drive information provided by the BIOS for all other bootable drives can be used to separately indicate secondary boot drives.

Figure 5:
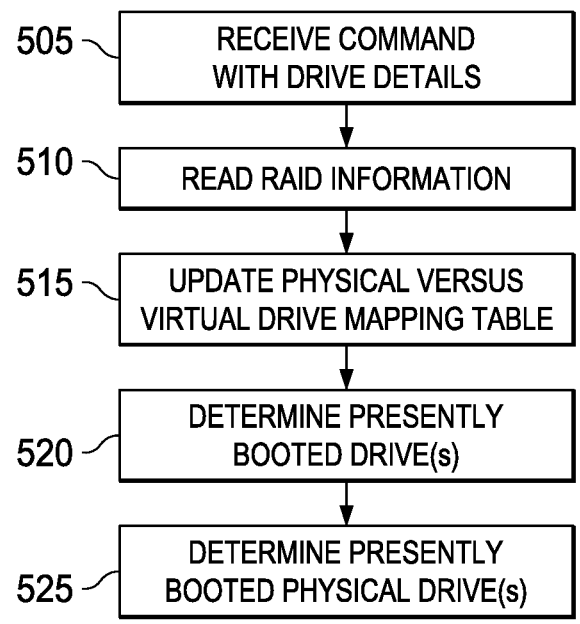
FIG. 5 is a flowchart illustrating certain steps of an additional method for certain aspects of detecting and reporting physical locations of bootable drives, according to various embodiments.

FIG. 5 is a flowchart that illustrates certain aspects of a process by which certain embodiments determine the physical storage drive(s) that are associated with virtual drives determined to have bootable operating systems installed upon them. As described with respect to FIG. 4, the BIOS maintains a list of available operating systems that can be booted by the server component and the storage drive from which each available operating system can be loaded. However, the storage drive hosting the bootable operating system may be a virtual drive. A virtual drive may span one or more physical storage devices. Consequently, in scenarios where a bootable virtual drive spans multiple physical storage devices, the location of each of the multiple physical storage devices associated with the bootable virtual drive must be identified.

In certain embodiments, the BMC is responsible for resolving any virtual drives to corresponding physical storage device(s). At step 505, the BMC receives a command providing drive information associated with bootable drives that have been identified. In certain embodiments, this drive information is supplied by the BIOS via the command issued with respect to step 430 of FIG. 4. Upon receiving this command, the BMC proceeds to determine a mapping between the virtual drives the have been configured for use by the server component and the physical drive(s) associated with these virtual drives. At step 510, the virtual drive information is obtained by the BMC. In certain embodiments, the virtual drive information is obtained from the configured RAID settings of the server component. These RAID settings may be maintained along with other device settings maintained by the server component and provide a listing of virtual drives that have been configured and the physical drive(s) utilized by each virtual drive. In certain embodiments, RAID settings, or other settings that identify configured virtual drives, are made available by the storage controller of the server component. At step 515, a table providing the mappings between virtual and physical drives is updated based on the virtual drive information. At step 520, the BMC reads the drive information provided by the BIOS indicating presently booted drives. At step 525, the mapping table is used to determine if the presently booted drive is a virtual drive, in which case, the physical drive(s) associated with the virtual drive is retrieved. This physical drive information is then used as described with respect to FIG. 3 to provide a visual indicator identifying the locations of the storage devices used by the booted virtual drive. In certain embodiments, this same process is used to indicate the location of storage devices associated with bootable virtual drives that are not presently booted by the INS.

In certain embodiments, the BMC may be further configured to confirm the bootable drive determinations based on monitored activity in the server component's storage devices. In such embodiments, the BMC is configured to monitor the workload of individual storage devices. In some embodiments, the BMC may be further configured to relay monitored storage device activity using the visual indicators similar to those described herein for the identification of bootable storage devices. Upon booting of the server component, the BMC may be configured to monitor storage device activity upon the BIOS completing the selection and booting an operating system. Based on this monitoring of storage devices, the BMC can verify that a storage device determined to be presently booted is active, thus confirming the determination to activate visual indicators identifying the storage device as presently booted.

* * *

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a plurality of drive bays coupled to the processor, each of the plurality of drive bays configured to receive one of a plurality of storage devices, and each of the plurality of drive bays coupled to a corresponding visual indicator; and
a Baseband Management Controller (BMC) coupled to the processor, the BMC configured to:
identify a given one of the plurality of storage devices as having an Operating System (OS) stored thereon that is not currently booted; and
control a visual indicator of a drive bay where the given storage device is located to provide the identification.

2. The IHS of claim 1, wherein, to identify the given storage device, the BMC is further configured to:
receive, from a storage controller, drive information for each of the plurality of storage devices;
receive, from a Basic Input/Output System (BIOS), an identification of the given storage device; and
identify the drive bay based on the drive information and the identification of the given storage device.

3. The IHS of claim 1, wherein the visual indicator is a status light generated by a light source.

4. The IHS of claim 2, wherein the drive information received from the storage controller comprise UEFI instructions that specify each storage device received at the plurality of drive bays.

5. The IHS of claim 4, wherein the identification of the given storage device are modifications to the UEFI instructions.

6. The IHS of claim 1, wherein the BMC is further configured to:
identify a booted storage device among the plurality of storage devices, in response to a determination that the IHS is operating under control of another OS stored on the booted storage device; and
control another visual indicator of another drive bay that receives the identified booted storage device.

7. The IHS of claim 1, wherein the given storage device comprises a virtual drive.

8. A memory device having program instructions stored thereon that, upon execution by a server component comprising a plurality of drive bays, wherein a visual indicator is associated with each drive bay, and wherein each drive bay is configured to receive a storage device, cause the server component to:
identify a storage device as having an Operating System (OS) stored thereon that is not currently booted; and
control a visual indicator associated with a drive bay where the storage device is located to provide the identification.

9. The memory device of claim 8, wherein the visual indicator is a graphical component of a remote management interface.

10. The memory device of claim 9, wherein the visual indicator is activated in response to a command issued via the remote management interface.

11. The memory device of claim 8, wherein the visual indicator is a textual response activated in response to a command issued via a command-line interface.

12. The memory device of claim 8, further comprising program instructions that, upon execution, further cause the server component to:
receive, from a storage controller, drive information for each of the plurality of storage devices;
receive, from a Basic Input/Output System (BIOS), an identification of the storage device; and
identify the drive bay based on the drive information and the identification of the storage device.

13. The memory device of claim 8, further comprising program instructions that, upon execution, further cause the server component to:
identify a booted storage device among the plurality of storage devices, in response to a determination that the IHS is operating under control of another OS stored on the booted storage device; and
control another visual indicator associated with another drive bay that receives the identified booted storage device.

14. The memory device of claim 8, wherein the storage device comprises a virtual drive.

15. A method for identifying storage devices received at one of a plurality of drive bays of a server component, wherein a visual indicator is associated with each drive bay, the method comprising:
identifying a storage device as having an Operating System (OS) stored thereon that is not currently booted; and
controlling a visual indicator associated with a drive bay where the storage device is located to provide the identification.

16. The method of claim 15, wherein identifying the storage device further comprises:
receiving, from a storage controller, drive information for each of the plurality of storage devices;
receiving, from a Basic Input/Output System (BIOS), an identification of the storage device; and
identifying the drive bay based on the drive information and the identification of the storage device.

17. The method of claim 15, wherein the visual indicator is a status light generated by a light source.

18. The method of claim 16, wherein the drive information received from the storage controller comprise UEFI instructions that specify each storage device received at the plurality of drive bays.

19. The method of claim 18, wherein the identification of the storage device are modifications to the UEFI instructions.

20. The method of claim 15, further comprising:
identifying a booted storage device among the plurality of storage devices, in response to a determination that the IHS is operating under control of another OS stored on the booted storage device; and
controlling another visual indicator associated with another drive bay that receives the identified booted storage device.

* * * * *